(12) United States Patent
Kitayama et al.

(10) Patent No.: US 6,835,340 B2
(45) Date of Patent: Dec. 28, 2004

(54) PROCESS FOR PRODUCING MULTILAYER MOLDED ARTICLE

(75) Inventors: Takeo Kitayama, Scarsdale, NY (US); Atsushi Saitoh, Sakata (JP)

(73) Assignee: Sumitomo Chemical Company, Ltd., Osaka (JP)

( * ) Notice: Subject to any disclaimer, the term of this patent is extended or adjusted under 35 U.S.C. 154(b) by 242 days.

(21) Appl. No.: 10/076,609

(22) Filed: Feb. 19, 2002

(65) Prior Publication Data

US 2002/0190427 A1 Dec. 19, 2002

(30) Foreign Application Priority Data

Feb. 19, 2001 (JP) ................................ P2001-042234
Feb. 19, 2001 (JP) ................................ P2001-042235

(51) Int. Cl.$^7$ ................................ B29C 45/14; B29C 45/16
(52) U.S. Cl. ................ 264/243; 264/247; 264/257; 264/348; 264/266; 425/127; 425/129.1
(58) Field of Search ................ 264/266, 247, 264/243, 257, 328.16, 348; 425/127, 129.1

(56) References Cited

FOREIGN PATENT DOCUMENTS

| EP | 0955143 A2 | * 11/1999 |
|----|-----------|-----------|
| JP | 10-58485 | 3/1998 |
| JP | 11-314227 | 11/1999 |
| JP | 11-320589 | 11/1999 |

* cited by examiner

*Primary Examiner*—Edmund H. Lee
(74) *Attorney, Agent, or Firm*—Fitch, Even, Tabin & Flannery

(57) ABSTRACT

A method for producing a multilayer molded article in which an skin material having nap on the outer surface thereof is integrally molded with a substrate of a synthetic resin, using a mold comprising a pair of male and female mold halves. In this method, after the fabric skin material and the molten resin are clamped in the mold and primary cooling is carried out, the mold is opened halfway to form a predetermined gap between the mold halves, and the molten synthetic resin undergoes secondary cooling and hardens while the mold is held in the half-open state. In the present invention, the time period for the operation to open the mold halfway is set at one second or less. By limiting the half-opening operation time period to the short period of one second or less, recovery of the nap is reliably achieved without the nap tending to stay flattened. Moreover, because the transition from the primary cooling step to the secondary cooling step occurs in a short period of time, problems such as inadequate cooling of the molten synthetic resin do not occur.

8 Claims, 5 Drawing Sheets

PROCESS FOR PRODUCING MULTILAYER MOLDED ARTICLE

BACKGROUND OF THE INVENTION

1. Field of the Invention

The present invention relates to a method for producing a multilayer molded article in which an skin material having nap on the outer surface, such as a fabric skin material, is attached on the outer surface of a substrate made of synthetic resin.

2. Description of the Related Art

A multilayer molded article that includes a fabric skin material attached thereon is widely used, for example, as an automobile interior component (such as in door trim or on an instrument panel) or as an component mounted on the exterior or in the interior of home electrical appliances.

As a method for producing such a multilayer molded article, a method is known in which, for example, molten thermoplastic resin is supplied to a mold comprising a pair of male and female mold halves after a fabric skin material is placed therein and the mold is held at a predetermined clamping pressure, so that the molten thermoplastic resin is molded into a predetermined configuration and that, at the same time, the fabric skin material is attached on the outer surface of the molded resin. This method offers the advantage that the fabric skin material is attached on the outer surface of the substrate made of thermoplastic resin simultaneously with the molding of the substrate, but the problem exists that the fabric skin material becomes flattened due to the clamping pressure, and the esthetic appeal (i.e., the appearance, feel, etc.) of the resulted article is compromised.

Accordingly, as a method to eliminate the loss in esthetic appeal due to the flattening of the fabric skin material in this fashion, a method has been proposed in which the mold is opened slightly after a clamping and primary cooling step, thereby forming a gap between the outer surface of the fabric skin material and the molding surface of the mold, and this condition is maintained while the thermoplastic resin undergoes secondary cooling (Japanese Patent Laid-Open No. 10-58485, Japanese Patent Laid-Open No. 11-314227). Using this method, a recovery space for the flattened nap on the outer surface of the fabric skin material is maintained, such that the previously flattened nap rises during secondary cooling, enabling a molded article that exhibits little flattening to be obtained.

However, even using this method, there remain the problems that a molded article having a good appearance is not always obtained because sufficient recovery of the flattened nap does not always occur, and that deformation sometimes occurs in the molded article due to inadequate cooling.

Accordingly, an object of the present invention is to provide a method for producing a multilayer molded article in which a fabric skin material is integrally molded with a synthetic resin substrate using a mold comprising a pair of male and female mold halves, wherein the loss in the appearance and feel due to the flattening of the fabric skin material is reliably prevented and deformation of the molded article is prevented as well.

SUMMARY OF THE INVENTION

The present invention is a method for producing a multilayer molded article in which an skin material having nap on the outer surface thereof is integrally molded with a synthetic resin substrate using a mold comprising a pair of male and female mold halves that can be moved toward and away from each other, wherein such method includes a first step of supplying a skin material to the gap between the pair of male and female halves of the mold while they are in an opened state, a second step of supplying molten synthetic resin between the back surface of the skin material and the molding surface of one of the pair of male and female mold halves that faces such back surface, a third step of clamping the mold either after the thermoplastic resin has been supplied or while it is being supplied, a fourth step of carrying out primary cooling of the molten synthetic resin while the mold is being clamped under a predetermined clamping pressure, a fifth step of opening the mold halfway and forming a predetermined gap between the pair of male and female mold halves, a sixth step of carrying out secondary cooling of the molten synthetic resin while the mold is being held in this half-open state, and a seventh step of opening the mold after the molten synthetic resin has hardened and extracting a molded article as a final product.

According to one aspect of the present invention, the time period of the operation of the fifth step to open the mold halfway is set at one second or less.

In other words, if the time period for the operation of the fifth step in which the mold is opened halfway exceeds one second, the nap tends to stay flattened during the half-opening operation, and the rising of the nap during the sixth step in which secondary cooling is performed does not take place completely, but if the half-opening step is carried out in a short interval of one second or less, the nap recovers its shape in a reliable fashion without acquiring the tendency to stay flattened. Furthermore, because the time period between the fourth step, i.e., the primary cooling step, and the sixth step is no more than one second, problems such as inadequate cooling of the molten synthetic resin do not occur. Here, the time period for the half-opening operation is the time period from the beginning of the reduction in the mold clamping pressure to the point at which the mold is halfway open.

In another aspect of the present invention, the gap formed between the pair of male and female mold halves in the fifth step is determined by adjusting in increments of 0.1 mm to ensure that the color of the outer surface of the skin material does not change significantly after molding, as well as to ensure that there is minimal deformation during molding.

The hue of the coloring of the outer surface of the fabric skin material may change due to the degree of flattening nap. Consequently, where the change in the color of the fabric skin material after molding is the smallest, the state of the nap after molding is close to the state of the nap before molding, in which there is a minimum amount of flattening. This is due to the fact that, because the pressure applied by the surface of the mold on the outer surface of the fabric skin material is reduced as the half-opening gap widens and the rising of the nap that was flattened takes place in a more reliable fashion in the sixth (secondary cooling) step, the change in the color of the outer surface of the fabric skin material after molding becomes small. On the other hand, if the half-opening gap becomes too wide, the cooling of the molten thermoplastic resin in the secondary cooling step becomes insufficient and deformation of the molded article can easily occur. Accordingly, by setting the size of the half-opening gap such that the change in the color of the outer surface of the fabric skin material after molding is small and there is minimal deformation in the molded article, insufficiency of cooling of the molten thermoplastic resin is prevented during the second cooling step and the optimal amount of recovery of the flattened nap on the outer surface of the fabric skin material is obtained. Moreover, by adjusting the gap in minute increments of 0.1 mm, the optimal size of the half-opening gap in order to obtain a molded article exhibiting the least amount of flattening and deformation can be reliably determined.

Furthermore, the present invention comprises a method for producing a multilayer molded article by integrally molding an skin material having nap on the outer surface thereof and a synthetic resin substrate using a mold comprising a pair of male and female mold halves that can come into contact with or move away from each other, wherein one of the mold halves has a movable block that is located such that it can be moved closer to or farther away from the other mold half, and the surface of the movable block facing the other mold half comprises part of the molding surface of such one mold half, and wherein such method includes a first step of supplying a skin material to a gap between the pair of male and female mold halves while the mold is in an open state and positioning the skin material such that it faces the movable block surface described above, a second step of supplying molten synthetic resin to the gap between the back surface of the skin material and the molding surface of the other mold half that faces such back surface, a third step of clamping the mold either after the molten synthetic resin has been supplied or while the molten synthetic resin is being supplied, a fourth step of carrying out primary cooling of the molten synthetic resin while the mold is being clamped under a predetermined clamping pressure, a fifth step of moving the movable block away from the other mold half and forming a predetermined gap between the movable block and the other mold half, a sixth step of carrying out secondary cooling of the molten synthetic resin while the mold is being held in the ending state of the fifth step, and a seventh step of opening the mold after the molten synthetic resin has hardened and extracting a molded article as a final product.

In this method, in another aspect of the present invention, the time period for moving the movable block in the fifth step is one second or less.

Using this method, by setting the time period for the moving of the movable block to a short interval of one second or less, the nap can be reliably restored without it acquiring the tendency to stay flattened. Furthermore, because the time period between the fourth step, i.e., the primary cooling step, and the sixth step is no more than one second, problems such as inadequate cooling of the molten synthetic resin do not occur.

In another aspect of the present invention, the gap formed between the movable block and the other mold half in the fifth step is adjusted and determined in increments of 0.1 mm to ensure that the color of the outer surface of the skin material does not change significantly after molding, as well as to ensure that there is minimal deformation.

Using this method, because the gap between the movable block after it is moved and the other mold half has the optimal size, the nap can be reliably restored and problems such as inadequate cooling of the molten synthetic resin can be prevented.

It is preferred that the gap between the pair of male and female pair of mold halves in the half-opening step, or the gap between the movable block and the other mold half in the movable block movement step, be set to 80% or more of the thickness of the final product. If the gap is less than 80% of such thickness, the pressure applied to the outer surface of the fabric skin material becomes large and the flattened nap may not be restored uniformly, and if the gap exceeds 100% of the thickness of the final product, there is insufficient cooling of the molten synthetic resin during secondary cooling. Here, the thickness of the final product is the sum of the preset thickness of the synthetic resin substrate and the thickness of the skin material before molding.

Furthermore, it is preferred that the fourth step, i.e., the primary cooling step, be divided into a first stage and a second stage, and that the mold be held at a first clamping pressure in the first stage and at a second clamping pressure that is smaller than the first clamping pressure in the second stage. The reason for this is that, if during the second stage of the primary cooling step the pressure applied to the outer surface of the fabric skin material is reduced relative to the pressure applied during the first stage, the tendency of the nap to stay flattened is mitigated. As a result, the flattened nap can be reliably restored during the subsequent second cooling step period. Moreover, because the mold comprising a pair of male and female mold halves is held at the second clamping pressure in the second stage as well, the problem of inadequate cooling of the molten synthetic resin does not occur during primary cooling, and there is no deformation of the obtained molded article.

These and other features and advantages of the present invention will become apparent to those skilled in the art upon a reading of the following detailed description when taken in conjunction with the drawings wherein there is shown and described an illustrative embodiment of the invention.

DESCRIPTION OF THE PREFERRED EMBODIMENTS

Embodiments of the present invention will be described below with reference to the accompanying drawings. In the following description, like references characters designate like or corresponding parts throughout the several views. Furthermore, in the following description, the multilayer molded article is a molded article in which an skin material is attached on a thermoplastic resin substrate, and the skin material is an outer layer such as a fabric skin material that is made of synthetic resin and has an outer surface with a nap having a length of at least 1 mm. In addition, it should be understood that the embodiments described below are only illustrations of the present invention, which is not limited thereby.

Now, a first embodiment will be described. The method for producing a multilayer molded article according to the first embodiment is a method in which a fabric skin material and a substrate are integrally formed using the injection press molding method. This embodiment employs a vertical molding apparatus which can opens and closes vertically. That is, the molding apparatus includes a mold having a male and female pair of mold halves that can come into contact with or move away from each other.

Figure 1:
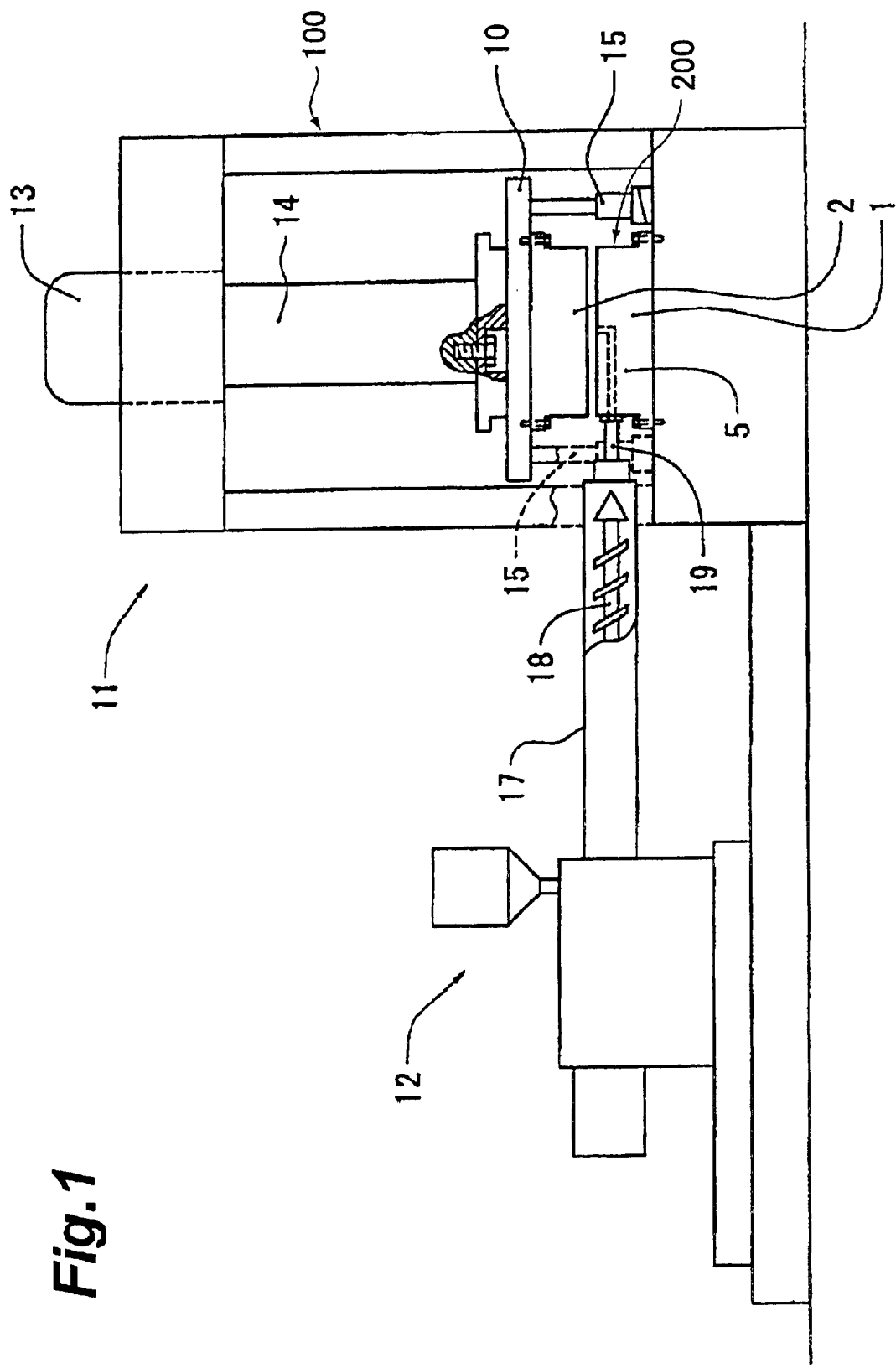
FIG. 1 is a side view schematically showing the molding apparatus in which the present invention may be applied.

FIG. 1 is a side view of the basic construction of the molding apparatus 100. As shown in FIG. 1, the molding apparatus 100 includes a direct pressure-type clamping mechanism 11 and a horizontal ejection-type injector 12.

The mold 200 used in the molding apparatus 100, which is ordinarily used in injection press molding and the like, comprises a pair of mold halves (hereinafter termed the male mold half 1 and the female mold half 2), between which is formed a cavity having a desired product configuration when the mold is in the clamping position. The mold 200 can opens and closes vertically by the clamping mechanism 11. The male mold half 1 is stationary, while the female mold half 2 is movable.

The clamping mechanism 11 has a clamping cylinder 13 for opening and closing the mold 200 between a closed state and a completely open state, and an mold opening apparatus 15 for opening the mold halves 1 and 2 to a half-open position at which they are separated by a predetermined gap. Both the clamping cylinder 13 and the opening apparatus 15 are operated through hydraulic power, but it is also acceptable if they are driven through electric power. A plunger 14 as the output shaft for the clamping cylinder 13 is mounted to a mounting plate 10 that is fixed to the top surface of the female mold half 2. Through the driving of this clamping cylinder 13, the female mold half 2 can be moved up and down, thereby opening and closing the mold 200. The opening apparatus 15 has multiple cylinders connected in a parallel fashion to a hydraulic circuit not shown in the drawings, and are driven synchronously and with equal force. When controlling the opening apparatus 15, the female mold half 2 is raised a predetermined amount from the closed position away from the male mold half 1, and the mold 200 thereby reaches a half-open state. In other words, the female mold half 2 is raised from the closed position to the half-open position by driving the opening apparatus 15 at the time of releasing the pressure from the clamping cylinder 13 (which includes the moment cessation begins as well as the completion thereof), while the mold 200 is in the clamping position, or by driving the opening apparatus 15 and subsequently reducing the pressure exerted by the clamping cylinder 13. The gap W between the male mold half 1 and the female mold half 2 when the mold is in the half-open state is determined by the stroke of the mold opening apparatus 15.

The clamping mechanism 11 may also comprise an electric-powered device that uses a servomotor or the like as the drive source in lieu of the clamping cylinder 13. Where an electric-powered clamping mechanism is used, because the mold 200 can be opened to the half-open state with high precision, a component equivalent to the mold opening apparatus 15 is not necessary.

At the same time, the injector 12 has a screw 18 located inside a tubular cylinder 17. An injection nozzle 19 located at the front end of the injector 12 is connected to one end of a molten resin path 5 formed in the male mold half 1. The other end of the molten resin path 5 is connected to the resin supply opening 6 that opens onto the interior molding surface of the mold 200 (see FIGS. 2A to 2F). In this way, the molten thermoplastic resin that is plasticized in the cylinder 17 and injected from the injection nozzle 19 is supplied to the interior of the mold 200 via the molten resin path 5. The number of molten resin paths 5 and resin supply openings 6 may be one or two or more, depending on the configuration, size and the like of the ultimate product, and their location and configuration may determined appropriately.

The method for producing a multilayer molded article using the molding apparatus 100 will now be explained. This production method is carried out using the following steps ① to ⑦. FIGS. 2A to 2F are simplified views showing the production steps ① to ⑦.

<① Skin Material Supply Step>

Figure 2A:
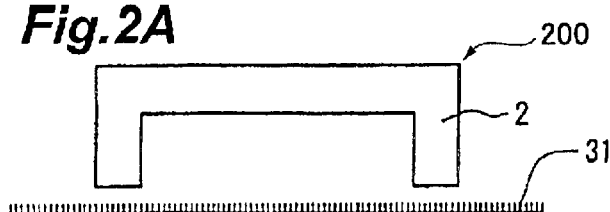
FIGS. 2A to 2F are views schematically showing the steps for producing a multilayer molded article in accordance with a first embodiment of the present invention.

First, the mold 200 is opened to the completely open state, as shown in FIG. 2A. In other words, the female mold half 2 is positioned at the completely open position at which it is located at a predetermined distance above the male mold half 1. The fabric skin material 3 is then supplied between the mold halves 1 and 2 while they are in the completely open state. At this time, the fabric skin material 3 is positioned such that the surface on which the nap 31 is formed (i.e., the outer surface) faces the female mold half 2. It is acceptable if this fabric skin material 3 is positioned such that it covers the molding surface, i.e., the top surface of the male mold half 1, if it is fixed using an skin material fixing frame (not shown) located between the male and female mold halves 1 and 2, or if it is fixed on the molding surface of the female mold half 2 using appropriate means (not shown) such as pins, and any desired fixing method may be used.

<② Molten Resin Supply Step>

Figure 2B:
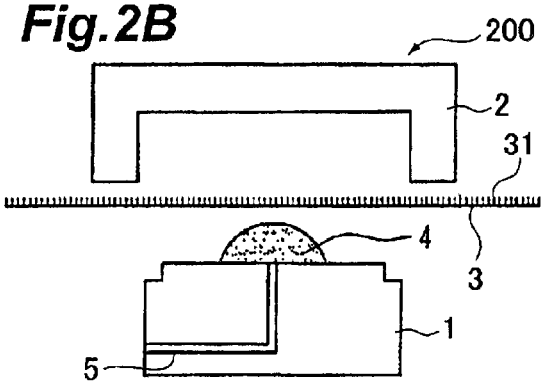

Molten thermoplastic resin 4 is then supplied between the fabric skin material 3 and the molding surface of the male mold half 1, as shown in FIG. 2B. When this occurs, the molten thermoplastic resin 4 is supplied between the molding surface on the substrate side (i.e., the molding surface of the male mold half 1) and the surface of the fabric skin material 3 on which the nap 31 is not formed (i.e., the back surface). The molten thermoplastic resin 4 is supplied from the injector 12 via the molten resin path 5 located inside the male mold half 1. Alternatively, the resin may be supplied by external supply means that supplies the resin directly to the molding surface from resin supply means such as an injector or other mechanism located outside the mold 200. Furthermore, the cavity clearance between the male and female mold halves 1 and 2 when the molten thermoplastic resin is supplied is appropriately determined by, specifically, the type and thickness of the fabric skin material 3 used, the type of thermoplastic resin used, the thickness of the molded substrate and the like.

<③ Clamping Step>

Figure 2C:
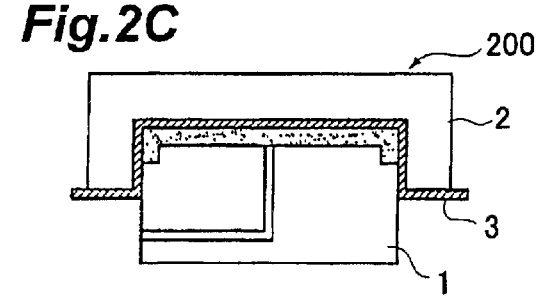

Next, the male and female mold halves 1 and 2 are closed and the clamping step is performed, as shown in FIG. 2C.

This clamping is carried out by driving the clamping cylinder 13 of the clamping mechanism 11 to extend the plunger 14. But, the step may be begun after the supply of molten thermoplastic resin 4 is completed, or synchronously with the molten resin supply step ②, i.e., parallel with the supply of the molten thermoplastic resin 4. Where clamping is carried out after the supply of molten thermoplastic resin 4 is completed, it is preferred that clamping begin immediately after the supply of molten thermoplastic resin 4 is completed in order to prevent deformation, etc. of the molded article. Through this clamping step, the back surface of the fabric skin material 3, i.e., the surface having no nap 31, is integrally attached on the molten resin layer at the same time that the outer surface of the fabric skin material 3 having the nap 31 comes into contact with the molding surface of the female mold half 2.

<④ Primary Cooling Step>

The molten thermoplastic resin 4 then undergoes primary cooling while [the mold 200] is held in the clamping state. The primary cooling is considered achieved if the surface area of the molten thermoplastic resin 4 has hardened slightly during maintenance of the clamping state, and it is not necessary for the center area of the thermoplastic resin in the direction of its thickness to have hardened completely.

At this time, by holding the pair of male and female mold halves 1 and 2 according to a predetermined clamping pressure, the molten thermoplastic resin can be cooled without deformation of the molded article. The mold 200 is held according to a first clamping pressure during the first stage of the primary cooling step ④, and is then held during the second stage according to a second clamping pressure that is lower than the first clamping pressure used in the first stage. In this way, because holding the mold 200 during the second stage according to a second clamping pressure that is lower than the first clamping pressure used in the first stage reduces the pressure applied to the outer surface of the fabric skin material 3 during the second stage and lessens the pressure on the nap 31, the tendency for the nap 31 to become flattened is mitigated. As a result, the nap 31 that becomes flattened can recover its shape more reliably during the subsequent secondary cooling step ⑥. Moreover, because the primary cooling step is also conducted while the mold 200 is being held according to the second clamping pressure during the second stage, the problem of deformation of the molded article due to insufficient cooling does not occur.

The switching from the first clamping pressure to the second clamping pressure can be accomplished by reducing the hydraulic pressure exerted on the clamping cylinder 13, or by driving the opening apparatus 15 to apply upward pressure on the female mold half 2 while holding constant the clamping pressure exerted by the clamping cylinder 13. The second clamping pressure is set to the optimal pressure as determined based on such factors as the type and thickness of the fabric skin material 3 used, the type and thickness of the thermoplastic resin comprising the substrate 40, and the resin temperature during molding, but from the standpoint of preventing deformation of the molded article, it is preferred that the second clamping pressure be set to a value that is between 10% and 80% of the first clamping pressure.

Depending on the type of fabric skin material 3 and substrate 40 used and the temperature of the resin during molding, the mold 200 may be held according to a uniform clamping pressure, without switching from a first clamping pressure to a second clamping pressure.

If the primary cooling period is too short, significant deformation of the molded article can result, while if the primary cooling period is too long, substantial damage occurs to the fabric skin material 3 and the nap does not recover its shape. Consequently, the total time used for primary cooling, as well as the time periods for the first and second stages, are set to the optimal times in accordance with such factors as the type and thickness of the used fabric skin material 3, the resin temperature during molding and the clamping pressure. As a typical rule, where the primary cooling period is between five and ten seconds, it is preferred that the clamping time in the first stage not exceed three seconds. For example, when producing a multilayer molded article in which a fabric outer layer 3 having a 6 mm nap is attached on a substrate 40 having a thickness of 2.5 mm, where the mold temperature is 30° C. and polypropylene resin (motel thermoplastic resin 4) heated to 200° C. is used, the primary cooling period should range from approximately five seconds to ten seconds.

<⑤ Half-opening Step>

Figure 2D:
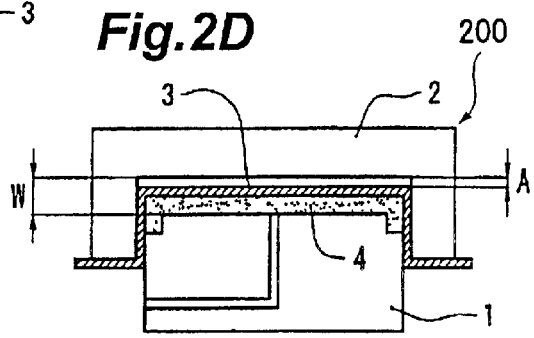

After the primary cooling step ④ has been completed, the pair of male and female mold halves 1 and 2 are half-opened such that they are separated by a predetermined gap W. as shown in FIG. 2D.

This half-opening step is carried out by raising the female mold half 2, the molding surface of which has been in contact with the outer surface of the fabric skin material 3. When this half-opening is done, a gap A is formed between the outer surface of the fabric skin material 3 and the molding surface of the female mold half 2. As a result, the clamping pressure exerted on the nap 31 on the outer surface of the fabric skin material 3 is reduced, thereby permitting the flattened nap 31 to rise and recover its shape during the subsequent secondary cooling step ⑥.

The gap W indicates the distance between the molding surface of the male mold half 1 and the molding surface of the female mold half 2, while the gap A indicates the difference between the molding surface of the female mold half 2 during the primary cooling step ④ and the molding surface of the female mold half 2 when the mold 200 is in the half-open state (see FIG. 2D).

This half-opening operation is carried out within one second or less. If the period for the half-opening operation exceeds one second, the nap 31 tends to get flattened even during this period and does not completely recover, but performing the operation within one second allows the nap 31 to recover its shape and eliminates the tendency toward flattening.

Moreover, because the transition from the primary cooling step ④ to the secondary cooling step ⑤ takes place in one second or less, the problem of inadequate cooling of the molten thermoplastic resin 4 also does not occur. Here, the half-opening operation time period is the period that elapses between the time that the clamping pressure on the mold 200 begins to be reduced after the primary cooling step ④ is completed and the time that the female mold half 2 reaches the half-open position. This half-opening operation may be carried out by either releasing the pressure from the clamping cylinder 13 (which includes the moment cessation begins as well as the completion thereof) and driving the opening apparatus 15, while the mold 200 is in the clamping position, or driving the opening apparatus 15 and subsequently reducing the pressure from the clamping cylinder 13. The method involving the prior driving of the opening apparatus 15 is preferred from the standpoint of speeding up the half-opening operation. Where the mold comprising a pair of male and female mold halves is held at the second clamping pressure during the second stage of the primary cooling step ④, the half-opening step can be more reliably carried out within one second. Furthermore, where an electric-powered clamping mechanism that uses a servomotor or the like is employed as the clamping mechanism 11, the half-opening operation can be performed within one second by switching the polarity supplied to the servomotor and raising the female mold half 2 to a predetermined half-open position.

Even where the half-opening operation is carried out in one second or less, if the gap W between the mold halves 1 and 2 is too narrow, the nap 31 that is flattened by the clamping pressure cannot recover its shape, and a molded article with an attractive appearance cannot necessarily be obtained. On the other hand, if the half-opening gap W is too wide, the problem of inadequate cooling becomes significant, and deformation of the molded article occurs. Therefore, the gap W must be set to the appropriate width.

When determining the width of the half-opening gap W, it is effective if the half-opening gap W between the male and female mold halves land 2 is adjusted in increments of 0.1 mm in order to minimize the difference in the color of the fabric skin material 3 after molding and the degree of deformation of the molded article. This involves performing the molding operation multiple times, changing the width of the gap W each time in 0.1 mm increments, observing the color difference in the outer surface of the fabric skin material and the degree of deformation in each obtained multilayer molded article, and selecting a gap W that results in the smallest color difference and deformation in the molded article.

The color difference in the outer surface of the fabric skin material 3 is observed for the following reason: because the hue of the outer surface of the fabric skin material 3 changes depending on the degree of flattening of the nap 31, it is understood that where the color difference in the outer surface of the fabric skin material 3 after molding is smallest, the condition of the nap 31 after molding is close to the condition of the nap 31 before molding, and the least amount of nap flattening occurs. This is due to the fact that the color difference in the outer surface of the fabric skin material 3 becomes smaller as the width of the half-opening gap W increases, because the nap 31 that was flattened rises in a reliable fashion during the secondary cooling step ⑥ when the pressure applied to the outer surface of the fabric skin material 3 by the molding surface is mitigated.

In addition, if the half-opening gap W is too wide, there is insufficient cooling of the molten thermoplastic resin 4 during the secondary cooling step ⑥, and deformation of the molded article can easily occur. Accordingly, the width of the half-opening gap W is determined subject to the condition that minimal deformation of the molded article occur during the molding step.

According to the method for determining the width of the gap W as described above, because the width of the gap W is adjusted in small increments of 0.1 mm, the gap W can be reliably set to the optimal width for obtaining a molded article with the smallest possible nap flattening and deformation. This adjustment in 0.1 mm increments is easily and reliably performed using the opening apparatus 15. In other words, because the pressure needed to raise the female mold half 2 to the half-open position is apportioned among the cylinders of the opening apparatus 15, the total stroke amount of the opening apparatus 15 as a whole can be easily controlled, and as a result, the female mold half 2 can be stopped at the half-open position far more precisely than when it is raised by a single clamping cylinder 13 that has a large capacity and relatively sluggish responsiveness. In addition, where an electric-powered clamping mechanism that uses a servomotor is employed, the female mold half 2 can be raised to the predetermined half-open position with great precision by the servomotor.

It is preferred that the width of the gap W between the mold halves 1 and 2 fall within a range between 80% of the thickness of the final product and the total thickness of the final product. Here, the thickness of the final product is defined as the sum of the preset thickness of the substrate 40 and the thickness of the fabric skin material 3 prior to molding.

By performing the half-opening step ⑤ using the half-opening gap W determined in this manner, the flattened nap 31 on the fabric outer layer 3 is restored in an optimal fashion in the subsequent secondary cooling step ⑥ while insufficient cooling of the molten thermoplastic resin 4 is prevented.

The optimal width of the gap W can be automatically sought by building a software program that pre-registers the hue of the back surface of the fabric outer layer 3 prior to molding and the design configuration of the final product, reads, using a desired image analyzer or other apparatus that is equipped with an image pickup device, the hues of the outer surfaces of post-molding fabric skin materials 3 and the configurations of the molded articles obtained using various gaps W obtained through adjustment in 0.1 mm increments, analyzes the color differences and degrees of deformation of the molded articles, and automatically determines the value that brings about the minimal color difference and deformation, and by seeking the optimal position of the gap W based on processing carried out by such program.

<⑥ Secondary Cooling Step>

Figure 2E:
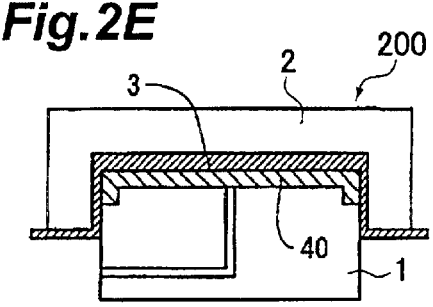

Secondary cooling of the molten thermoplastic resin 4 is next carried out while the mold 200 is held in the half-open state, as shown in FIG. 2E.

This secondary cooling is performed until the center portion of the clamped molten thermoplastic resin 4 in terms of its thickness has hardened, as in the normal molding method. Furthermore, with regard to the fabric skin material 3 that is compressed by the clamping performed in the primary cooling step ④, the flattened nap 31 recovers its shape during the cooling period of the secondary cooling step ⑥.

<⑦ Product Extraction Step>

Figure 2F:
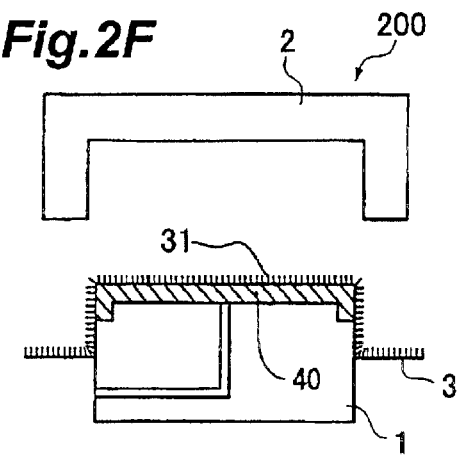
Figure 3:
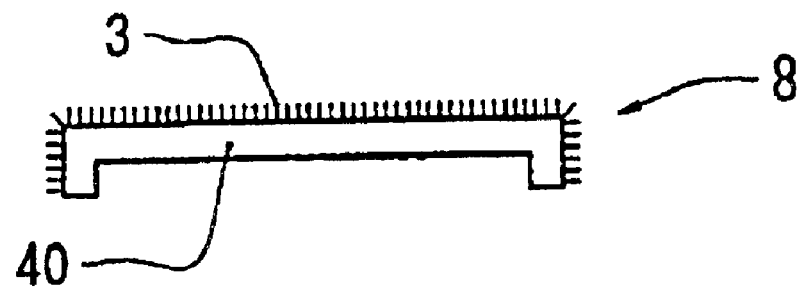
FIG. 3 is a summary cross-section of the multilayer molded article produced according to the steps shown in FIGS. 2A to 2F.

After the molten thermoplastic resin 4 has hardened to become the substrate 40, the mold 200 is opened and the multilayer molded article is extracted, as shown in FIG. 2F. The resulted article includes the fabric skin material 3 attached on the substrate 40, and the 31 nap on the skin material 3 recovers its shape. Thereafter, the unnecessary parts of the fabric skin material 3 outside the substrate 46 are cut off, and the final product 8 made of the multilayer molded article is obtained (see FIG. 3).

As described above, according to the first embodiment, because the time period of the half-opening operation of the half-opening step ⑤ is limited to one second or less, the nap 31 on the outer surface of the fabric skin material 3 is reliably restored and inadequate cooling of the molten thermoplastic resin 4 does not occur. As a result, a multilayer molded article 8 having an attractive appearance with little flattened nap or deformation can be reliably obtained.

Moreover, because the width of the gap W is determined through adjustment in increments of 0.1 mm in order to minimize both the color difference in the outer surface of the fabric skin material 3 after molding and the degree of deformation, the reliability of the restoration of the nap 31, as well as the effect of preventing inadequate cooling of the thermoplastic resin 4, are further increased. In addition, where the half-opening gap determination method described here is used, the optimal half-opening gap W can be obtained, and as a result, a multilayer molded article having an attractive appearance with minimal nap flattening or deformation can be reliably obtained even if the time period of the half-opening operation of the half-opening step exceeds one second.

Figure 4:
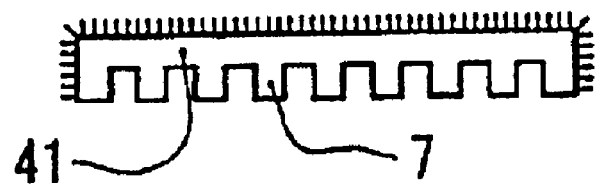
FIG. 4 is a cross-section schematically showing a multilayer molded article having ribs.

In the method described above, the deformation of the molded article can be controlled even more effectively where ribs 7 are formed on the back surface of the substrate 41 as shown in FIG. 4. This is realized by placing indentations and protrusions corresponding to the ribs 7 on the molding surface of the male mold half 1.

A second embodiment will now be described. The second embodiment is a method for producing a multilayer molded article wherein a fabric skin material is partially attached to the outer surface of a substrate. The principal aspect in which the second embodiment differs from the first embodiment is that in the second embodiment a movable block that can slide to advance and retract in the opening and closing directions is located on part of the female mold half, and the operation to retract this movable block (the movable block retraction step ⑤ described below) is equivalent to the half-opening step ⑤ shown in FIG. 2D. Therefore, a molding apparatus having a construction essentially identical to that of the molding apparatus 100 used in the first embodiment can be also used in this method, except that in lieu of the female mold half 2 shown in FIG. 1 and in FIGS. 2A to 2F, a female mold half 20 is used in which a movable block 21 is located at the area of the molding surface 23 that corresponds to the skin material attaching surface in a product and comes into contact with the fabric skin material 50, as shown in FIGS. 5A to 5F.

The size of the molding surface 24 of the movable block 21 corresponds essentially to the surface of the fabric skin material 50 to be attached. The movable block 21 is constructed such that it is embedded in the female mold half 20 and is connected to driving means 22, and can slide inside the mold 200A to advance and retract in the mold opening and closing directions via the driving means 22.

The driving means 22 may comprise a hydraulic cylinder, an electric-powered output shaft such as a servomotor, or other means.

Figure 5A:
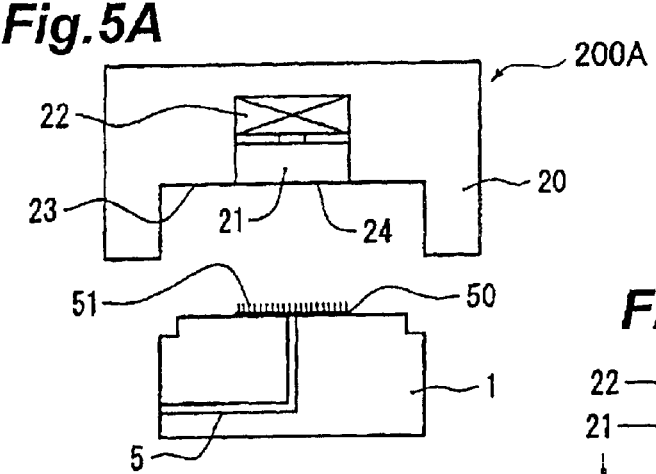
FIGS. 5A to 5F are views schematically showing the steps for producing a multilayer molded article pertaining to a second embodiment of the present invention.

In the state in which the movable block 21 has advanced the farthest, as shown in FIG. 5A, the molding surface 24 of the movable block 21 and the molding surface 23 of the female mold half 20 in which the movable block 21 is embedded form a single continuous molding surface. In this second embodiment, the mold opening apparatus 15 used in the first embodiment (see FIG. 1) need not be included in the clamping mechanism.

The multilayer molded article production method pertaining to the second embodiment will now be explained in detail below. This production method is carried out via the following steps (① to ⑦, in that order. FIGS. 5A to 5F are simplified views showing these production steps ① through ⑦.

<① Skin Material Supply Step>

First, as shown in FIG. 5A, the mold 200A is opened to the completely open state and the fabric skin material 50 is supplied between the male mold half 1 and the female mold half 20. When this is done, the fabric skin material 50 is supplied with the nap 51 facing upward to a position corresponding to the molding surface 24 of the movable block 21. FIG. 5A shows a situation in which the fabric skin material 50 is placed at a position on the molding surface of the male mold half 1 at which it faces the molding surface 24 of the movable block 21.

The fabric skin material 50 may be simply placed on top of the molding surface of the male mold half 1, but it is also acceptable if the position of the fabric skin material 50 is fixed using a fixing apparatus or other means to determine its position. The fabric skin material 50 may be supplied and fixed using any desired method. For example, depending on the positional relationship between the male and female mold halves 1 and 20 and the type, etc., of fabric skin material 50, the fabric skin material 50 may be placed directly on the molding surface 24 of the movable block 21, or the outer surface of the fabric skin material 50 may be temporarily affixed to the molding surface 24 of the movable block 21 using two-sided tape or similar means.

<② Molten Resin Supply Step>

Figure 5B:
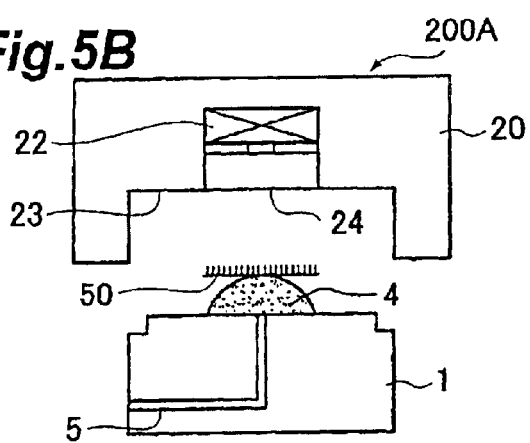

The molten thermoplastic resin 4 is next supplied between the fabric skin material 50 and the molding surface of the male mold half 1, as shown in FIG. 5B.

This molten resin supply step ② is essentially similar to that carried out in the first embodiment, except that when the molten thermoplastic resin 4 is supplied, normally, the position of the movable block 21 is pre-adjusted such that the molding surface 24 of the movable block 21 and the molding surface 23 of the female mold half 20 in which the movable block 21 is embedded form a continuous molding surface.

<③ Clamping Step>

Figure 5C:
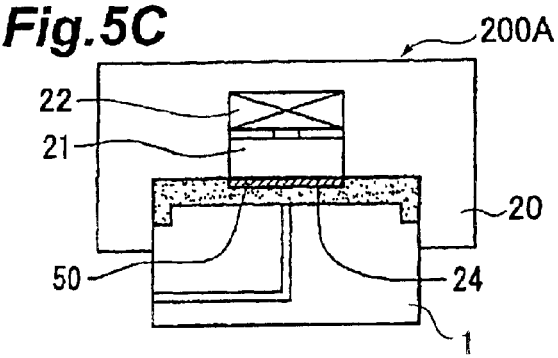

The male and female mold halves 1 and 20 are then closed and clamping is carried out, as shown in FIG. 5C. This clamping step ③ is also similar to that carried out in the first embodiment, and during this clamping step, the outer surface of the fabric skin material 50 comes into contact with the molding surface 24 of the movable block 21 at the same time that it is attached to part of the outer surface of the molten thermoplastic resin layer.

<④ Primary Cooling Step>

The molten thermoplastic resin 4 then undergoes primary cooling while being held in the clamped state. This primary cooling step ④ is also similar to that carried out in the first embodiment. In other words, the mold 200A may be held according to a first clamping pressure during the first stage of this primary cooling step ④ and then held during the subsequent second stage according to a second clamping pressure that is smaller than the first clamping pressure, or alternatively, the mold 200A may be held according to a uniform clamping pressure throughout the entire primary cooling step ④.

<⑤ Movable Block Movement (Retraction) Step>

Figure 5D:
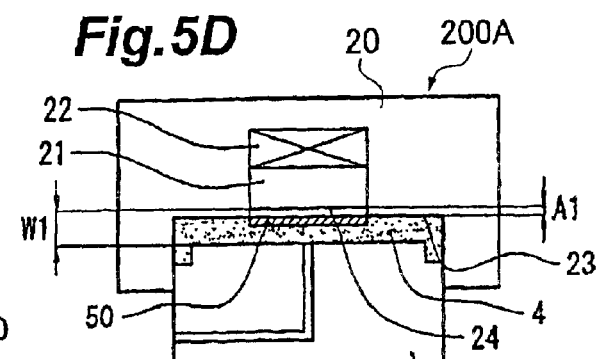
Figure 5E:
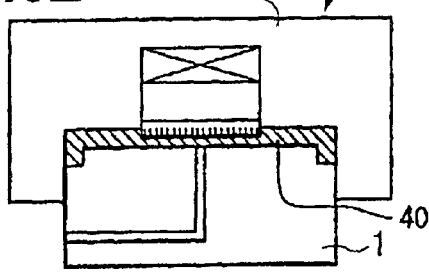
Figure 5F:
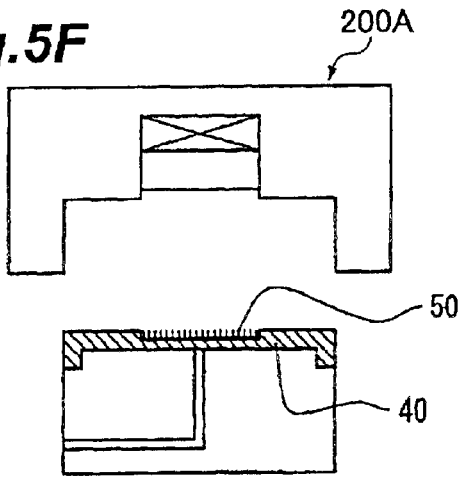

Once the primary cooling step ④ is completed, the movable block 21 is retracted (moved upward) to form a predetermined gap A1 between the outer surface of the fabric skin material 50 and the molding surface 24 of the movable block 21, as shown in FIG. 5D.

The movable block 21 is retracted through the driving of the means 22 such as a hydraulic cylinder connected to the movable block 21. Thus, a gap A1 is formed between the outer surface of the fabric skin material 50 and the molding surface 24 of the movable block 21. As a result, the clamping pressure exerted on the nap 51 on the outer surface of the fabric skin material 50 is reduced, thereby causing the nap 51 that was flattened to rise during the cooling period of the subsequent secondary cooling step ⑥, enabling it to recover its shape.

The time period for the movement of the movable block 21, i.e., the retraction operation period (the time from the commencement to the completion of retraction) is one second or less, as with the half-opening period of the half-opening step ⑤ in the first embodiment. Consequently, the nap 51 can reliably recover its shape during the subsequent secondary cooling step ⑥ without staying flattened, and because the transition from the primary cooling step ④ to the secondary cooling step ⑥ takes in no more than one second, the problem of inadequate cooling of the molten thermoplastic resin 4 in the attaching area of the fabric skin material 50 does not occur.

The gap A1 formed by the retraction of the movable block 21 is the distance between the molding surface 23 of the female mold half 20 and the molding surface 24 of the movable block 21 when the movable block 21 has been retracted (see FIG. 5D). It is preferred that the gap W1 formed between the molding surface of the male mold half 1 and the molding surface 24 of the movable block 21 after retraction of the movable block 21 have a width that falls between 80% and 100% of the thickness of the final product.

Here, it is effective if the gap W1 is determined after adjustment in minute increments in order to minimize the color difference in the outer surface of the fabric skin material 50 after molding and the deformation of the molded article, as with regard to the half-opening step ⑤ in the first embodiment. In this way, the flattened nap 51 on the outer surface of the fabric skin material 50 can recover in an optimal fashion in the subsequent secondary cooling step ⑥ while inadequate cooling of the molten thermoplastic resin 4 is prevented.

By adjusting the width of the gap W1 in minute 0.1 mm increments, the optimal gap W1 that enables a molded article having minimal nap flattening and deformation to be obtained can be reliably determined.

Moreover, with respect to the gap W1, it is also acceptable if essentially the same software as that used in the half-opening step ⑤ in the first embodiment is built, and if the optimal position is automatically sought using this software.

<⑥Secondary Cooling Step & ⑦Product Extraction Step>

Figure 6:
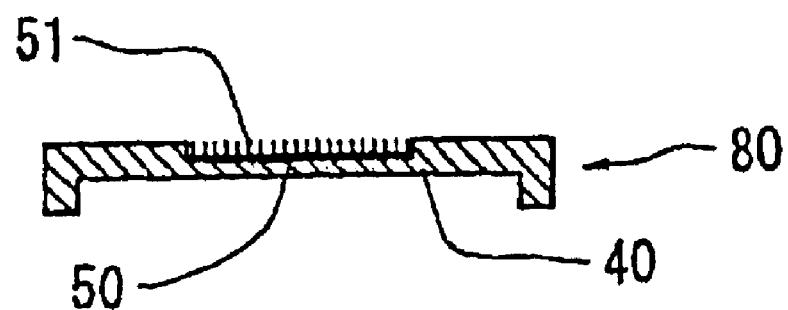
FIG. 6 is a cross-section of the multilayer molded article produced according to the steps shown in FIGS. 5A to 5F.

As in the first embodiment, after the molten thermoplastic resin 4 has undergone secondary cooling while the movable block 21 is held in the retracted state (see FIG. 5E) and the molten thermoplastic resin 4 has hardened to become the substrate 40, the mold 200 is opened and the molded article is extracted (see FIG. 5F) In the processes ① through ⑦ described above, a multilayer molded article 80 is produced in which a fabric skin material 50 having a restored nap 51 is partially attached on a substrate 40, as shown in FIG. 6.

In this second embodiment as well, because the time period of the operation to retract the movable block 21 in the movable block 21 retraction step ⑤ is limited to one second or less, the nap 51 on the outer surface of the fabric skin material 50 can be reliably restored, and such problems as inadequate cooling of the molten thermoplastic resin 4 do not occur. As a result, a multilayer molded article 80 that has an attractive appearance and does not exhibit nap flattening or deformation can be reliably obtained.

In addition, because the gap W1 between the molding surface 24 after the movable block 21 is retracted in the movable block 21 retraction step ⑤ and the molding surface of the male mold half 1 is determined through adjustment in increments of 0.1 mm so as to minimize the color difference in the outer surface of the fabric skin material 50 after molding as well as the deformation of the molded article, the nap 31 can be restored more reliably and the effect of preventing inadequate cooling of the thermoplastic resin 4 is strengthened. Where this gap determination method is used, because an extremely accurate gap W1 is obtained, a multilayer molded article having an attractive appearance with minimal flattened nap or deformation can be obtained even if the time period of the retraction operation of the retraction step ⑤ exceeds one second.

Depending on the relationship between the surface area of the entire substrate 40 and the area of the section on which the fabric skin material 50 is attached, the section of the substrate 40 on which the fabric skin material 50 is attached may be inadequately cooled due to the adiabatic effect of the fabric skin material 50, creating the risk of deformation of the molded article due to the different rates of cooling between the attaching area of the substrate 40 and the other areas thereof. Such deformation can be prevented by locating ribs 7 or other means on the back of the substrate 41, as shown in FIG. 4. Furthermore, the movable block 21 is not limited to any particular configuration and number. Its molding surface may have various different configurations, and multiple movable blocks 21 may be used.

While the above description is useful in understanding the present invention and its advantages, the embodiments described herein are merely illustrative, and needless to say, various changes to the configuration, construction and arrangement thereof may be made without departing from the spirit and scope of the present invention.

For example, the opening and closing directions of the mold 200 or 200A are not essential features of the present invention, which could be implemented in an identical manner even if the mold were to open and close horizontally from left to right.

Furthermore, so long as the fabric skin material 3 or 50 applied in the method of the present invention has on the outer surface thereof a synthetic resin nap 31 or 51 having a length of 1 mm or more, there is no particular limitation on the type of fabric skin material that may be used. For example, a woven or knitted material having nap, such as moquette or tricot, or a non-woven fabric such as needle-punched carpet, may be used. These fabric skin materials may be used alone, but may also be used as a compound fabric skin material comprising two or more materials that are attached on each other using an adhesive or other substance. In particular, a fabric skin material that includes as the liner material foamed polyolefin resin sheeting such as foamed polypropylene sheeting, or foamed urethane sheeting, is often used. With regard to foamed polyolefin resin sheeting such as foamed polypropylene sheeting, both bridged-type foamed sheeting and non-bridged type foamed sheeting may be used, and there are no particular limitations regarding the expansion ratio thereof. Furthermore, depending on the configuration of the fabric skin material to be attached, the fabric skin material may be subject to preliminary molding.

Moreover, for the thermoplastic resin used to form the substrate 40 or 41 applied in the method of the present invention, any resin may be used that is normally used in common injection molding, injection pressure molding, extrusion molding or stamping molding, and there is no particular restriction on the material used. For example, such material may comprise a common thermoplastic resin such as polyolefin resin such as polyethylene or polypropylene, or polystyrene, acrylic resin, acrylonitrile-styrene-butadiene block copolymer, nylon or other polyamide, polyvinyl chloride, polycarbonate, or styrene-butadiene block copolymer, as well as a thermoplastic elastomer such as EPM or EPDM or a mixture thereof, or a polymer alloy that combines these materials. These resins may be foaming or non-foaming resins, and may include a filler consisting of an organic or inorganic filler comprising a reinforcing fiber such as glass fiber, talc, or Wallastonite. Naturally, various pigments, sliding materials, anti-static agents, antioxidants, anti-UV agents or other commonly used additives may be included where appropriate.

What is claimed is:

1. A method for producing a multilayer molded article in which a skin material having nap on the outer surface thereof is integrally molded with a substrate made of a synthetic resin, using a mold comprising a pair of male and female mold halves that can be moved toward and away from each other, said method comprising:

a first step of supplying the skin material to a gap between said pair of male and female halves of said mold in an opened state;

a second step of supplying molten synthetic resin between a back surface of said skin material and a molding surface of one of said pair of male and female mold halves that faces said back surface;

a third step of clamping said mold either after said molten synthetic resin has been supplied or while said molten synthetic resin is being supplied;

a fourth step of carrying out primary cooling of said molten synthetic resin while said mold is being clamped under a predetermined clamping pressure;

a fifth step of opening said mold halfway and forming a predetermined gap between said pair of male and female mold halves;

a sixth step of carrying out secondary cooling of said molten synthetic resin while said mold is being held in said half-open state; and a seventh step of opening said mold after said molten synthetic resin has hardened and extracting a molded article as a final product;

wherein the time period of the operation to open said mold halfway in said fifth step is no more than one second.

2. The method according to claim 1, wherein said gap between said pair of male and female mold halves in said fifth step equals or exceeds 80% of the thickness of said final product.

3. The method according to claim 1, wherein said fourth step is divided into a first stage and a second stage, and wherein said mold is held at a first clamping pressure in said first stage and said mold is held at a second clamping pressure that is smaller than said first clamping pressure in said second stage.

4. The method according to claim 1, wherein said gap formed between said pair of male and female mold halves in said fifth step is determined by adjusting in increments of 0.1 mm to ensure that the color of the outer surface of said skin material does not change significantly after molding and to ensure that there is minimal deformation of said molded article.

5. A method for producing a multilayer molded article in which a skin material having nap on the outer surface thereof is integrally molded with a substrate made of a synthetic resin, using a mold comprising a pair of male and female mold halves that can be moved toward and away from each other, said method comprising:

a first step of supplying the skin material to a gap between said pair of male and female halves of said mold in an opened state;

a second step of supplying molten synthetic resin between a back surface of said skin material and a molding surface of one of said pair of male and female mold halves that faces said back surface;

a third step of clamping said mold either after said molten synthetic resin has been supplied or while said molten synthetic resin is being supplied;

a fourth step of carrying out primary cooling of said molten synthetic resin while said mold is being clamped under a predetermined clamping pressure;

a fifth step of opening said mold halfway and forming a predetermined gap between said pair of male and female mold halves;

a sixth step of carrying out secondary cooling of said molten synthetic resin while said mold is being held in said half-open state; and a seventh step of opening said mold after said molten synthetic resin has hardened and extracting a molded article as a final product; and wherein said gap formed between said pair of male and female mold halves in said fifth step is determined by adjusting in increments of 0.1 mm to ensure that the color of the outer surface of the skin material does not change significantly after molding and to ensure that there is minimal deformation of said molded article.

6. The method according to claim 5, wherein said gap between said pair of male and female mold halves in said fifth step equals or exceeds 80% of the thickness of said final product.

7. The method according to claim 5, wherein said fourth step is divided into a first stage and a second stage, and wherein said mold is held at a first clamping pressure in said first stage and said mold is held at a second clamping pressure that is smaller than said first clamping pressure in said second stage.

8. A method for producing a multilayer molded article in which a skin material having nap on the outer surface thereof is integrally molded with a substrate made of a synthetic resin, using a mold comprising a pair of male and female mold halves that can be moved toward and away from each other, said method comprising:

a first step of supplying the skin material to a gap between said pair of male and female halves of said mold in an opened state;

a second step of supplying molten synthetic resin between a back surface of said skin material and a molding surface of one of said pair of male and female mold halves that faces said back surface;

a third step of clamping said mold either after said molten synthetic resin has been supplied or while said molten synthetic resin is being supplied;

a fourth step of carrying out primary cooling of said molten synthetic resin while said mold is being clamped under a predetermined clamping pressure;

a fifth step of opening said mold halfway and forming a predetermined gap between said pair of male and female mold halves;

a sixth step of carrying out secondary cooling of said molten synthetic resin while said mold is being held in said half-open state; and a seventh step of opening said mold after said molten synthetic resin has hardened and extracting a molded article as a final product;

wherein the time period of the operation to open said mold halfway in said fifth step is no more than one second, and wherein said gap formed between said pair of male and female mold halves in said fifth step is determined by adjusting in increments of 0.1 mm.

* * * * *